United States Patent
Watariuchi

(10) Patent No.: US 10,122,882 B2
(45) Date of Patent: Nov. 6, 2018

(54) INFORMATION PROCESSING APPARATUS, CONTROL METHOD FOR INFORMATION PROCESSING APPARATUS, AND PROGRAM STORAGE MEDIUM, RELATING TO DISPLAYING SETTING SCREENS ASSOCIATED WITH EXTENSION SOFTWARE

(71) Applicant: CANON KABUSHIKI KAISHA, Tokyo (JP)

(72) Inventor: Satoki Watariuchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/414,082

(22) Filed: Jan. 24, 2017

(65) Prior Publication Data
US 2017/0214814 A1    Jul. 27, 2017

(30) Foreign Application Priority Data
Jan. 26, 2016 (JP) ................................. 2016-012242

(51) Int. Cl.
G06K 15/00 (2006.01)
H04N 1/00 (2006.01)
G06F 9/48 (2006.01)

(52) U.S. Cl.
CPC ....... *H04N 1/00949* (2013.01); *G06F 9/4843* (2013.01); *H04N 1/00474* (2013.01); *H04N 1/00503* (2013.01); *H04N 2201/0094* (2013.01)

(58) Field of Classification Search
USPC ....... 358/1.1–3.29, 1.11–1.18; 345/619–663, 345/1.1–9
See application file for complete search history.

(56) References Cited

U.S. PATENT DOCUMENTS

| | | | | |
|---|---|---|---|---|
| 7,080,383 | B1* | 7/2006 | Fernando | G06F 8/24 717/120 |
| 8,797,571 | B2* | 8/2014 | Kong | H04N 1/00222 358/1.15 |
| 2003/0160821 | A1* | 8/2003 | Yoon | G06F 8/38 715/762 |
| 2009/0174897 | A1* | 7/2009 | Sato | H04N 1/00411 358/1.15 |
| 2012/0033255 | A1* | 2/2012 | Touyamasaki | H04N 1/00395 358/1.15 |
| 2016/0004484 | A1* | 1/2016 | Yamamoto | G06F 3/1205 358/1.13 |

(Continued)

FOREIGN PATENT DOCUMENTS

| | | |
|---|---|---|
| JP | 4039439 B2 | 1/2008 |
| JP | 2014-134872 A | 7/2014 |

*Primary Examiner* — Marcellus Augustin
(74) *Attorney, Agent, or Firm* — Canon U.S.A., Inc. IP Division

(57) ABSTRACT

In an information processing apparatus, when a workflow definition file with which a predetermined job is executed is created with a plurality of extension providers combined and when it is determined that at least one of the extension providers to be executed involves displaying of a setting screen corresponding to the at least one of the extension providers to be executed, a workflow definition file is created in which the setting screen is displayed before processing corresponding to a predetermined function to be executed by the at least one of the extension providers is executed.

14 Claims, 14 Drawing Sheets

530 FUNCTION PROVIDER I/F INFORMATION TABLE

| FUNCTION TYPE ID | FUNCTION TYPE NAME | FUNCTION PROVIDER INTERFACE | SETTING INTERFACE | EXECUTION INTERFACE |
|---|---|---|---|---|
| SCAN | SCAN | IScanProvider | showSettingUI | doScan |
| OCR | OCR | IOcrProvider | — | doOCR |
| SEND_FILE | SEND | ISendFileProvider | showSettingUI | doScan |
| ... | ... | | ... | ... |

(56) References Cited

U.S. PATENT DOCUMENTS

| | | | |
|---|---|---|---|
| 2016/0077770 A1* | 3/2016 | Morita | G06F 3/1253 358/1.15 |
| 2016/0255223 A1* | 9/2016 | Ishibashi | H04N 1/00482 358/1.13 |
| 2016/0373602 A1* | 12/2016 | Watariuchi | H04N 1/00973 |

* cited by examiner

FIG.6

530 FUNCTION PROVIDER I/F INFORMATION TABLE

| FUNCTION TYPE ID | FUNCTION TYPE NAME | FUNCTION PROVIDER INTERFACE | SETTING INTERFACE | EXECUTION INTERFACE |
|---|---|---|---|---|
| SCAN | SCAN | IScanProvider | showSettingUI | doScan |
| OCR | OCR | IOcrProvider | — | doOCR |
| SEND_FILE | SEND | ISendFileProvider | showSettingUI | doScan |
| ... | ... | | ... | ... |

FIG.8

WORKFLOW DEFINITION FILE 440

```
810 — <Workflow id="..." name="SCAN & OCR AND THEN SEND">
820 —   <FP no="1" type="SCAN">
821 —     <Condition>...
          </Condition>
822 —     <Action no="1" method="showSettingUI">
            <Parameter>...
            </Parameter>
          </Action>
823 —     <Action no="3" method="doScan">
            <Parameter>...
            </Parameter>
            <Output type="Document" id="foo" />
          </Action>
        </FP>

830 —   <FP no="2" type="OCR">
          <Condition>...
          </Condition>
831 —     <Action no="4" method="doOCR">
            <Input type="Document" src="foo" />
            <Parameter>...
            </Parameter>
            <Output type="String" id="bar" />
          </Action>
        </FP>

840 —   <FP no="3" id="SEND">
          <Condition>...
          </Condition>
841 —     <Action no="2" method="showSettingUI">
            <Parameter>...
            </Parameter>
          </Action>
842 —     <Action no="5" method="doSend">
            <Input type="Document" src="foo" />
            <Input type="String" src="bar" />
            <Parameter>...
            </Parameter>
          </Action>
        </FP>
      </Workflow>
```

FIG.9

WORKFLOW DEFINITION FILE 440

```
910 ─ <Workflow id="..." name="SCAN & OCR AND THEN SEND">
920 ─   <FP no="1" type="SCAN">
          <Condition>...
          </Condition>
821 ─     <Action no="2" method="doScan">
            <Parameter>...
            </Parameter>
            <Output type="Document" id="foo" />
          </Action>
        </FP>

930 ─   <FP no="2" type="OCR">
          <Condition>...
          </Condition>
931 ─     <Action no="3" method="doOCR">
            <Input type="Document" src="foo" />
            <Parameter>...
            </Parameter>
            <Output type="String" id="bar" />
          </Action>
        </FP>

940 ─   <FP no="3" id="SEND">
          <Condition>...
          </Condition>
941 ─     <Action no="1" method="showSettingUI">
            <Parameter>...
            </Parameter>
          </Action>
942 ─     <Action no="4" method="doSend">
            <Input type="Document" src="foo" />
            <Input type="String" src="bar" />
            <Parameter>...
            </Parameter>
          </Action>
        </FP>
      </Workflow>
```

FIG.10

WORKFLOW DEFINITION FILE 440

```xml
1010  <Workflow id="..." name="SCAN & OCR AND THEN SEND">
1020    <FP no="1" type="SCAN">
          <Condition>...
          </Condition>
1021      <Action no="1" method="showSettingUI">
            <Parameter>...
            </Parameter>
          </Action>
1022      <Action no="2" method="doScan">
            <Parameter>...
            </Parameter>
            <Output type="Document" id="foo" />
          </Action>
        </FP>

1030    <FP no="2" type="OCR">
          <Condition>...
          </Condition>
1031      <Action no="3" method="doOCR">
            <Input type="Document" src="foo" />
            <Parameter>...
            </Parameter>
1032        <Output type="String" id="bar" />
          </Action>
        </FP>

1040    <FP no="3" id="SEND">
          <Condition>...
          </Condition>
1041      <Action no="4" method="showSettingUI">
1042        <Iutput type="String" src="bar" />
            <Parameter>
1043          <Property id="FILE_NAME" value="ABC_%bar%">
              ...
            </Parameter>
          </Action>
1044      <Action no="5" method="doSend">
            <Input type="Document" src="foo" />
            <Parameter>...
            </Parameter>
          </Action>
        </FP>
      </Workflow>
```

FIG.13

423 FUNCTION PROVIDER INFORMATION TABLE

| No | FUNCTION PROVIDER ID | NAME | FUNCTION TYPE ID | FUNCTION PROVIDER INTERFACE |
|---|---|---|---|---|
| 1 | 1NORMAL_SCAN | STANDARD SCAN | SCAN | IScanProvider |
| 2 | EASY_SCAN | SIMPLE SCAN | SCAN | IScanProvider |
| 3 | OCR_DEVICE | BUILT-IN OCR | OCR | IOcrProvider |
| 4 | OCR_WEB | Web OCR | OCR | IOcrProvider |
| 5 | NORMAL_SEND | STANDARD SEND | SEND_FILE | ISendFileProvider |
| ... | ... | ... | ... | |

FIG.14

FUNCTION PROVIDER INTERFACE DEFINITION 424/540

```
1401 -- public interface IScanProvider {
            public boolean showSettingUI(Parameter);
            public Document doScan(Parameter);
        }

1402 -- public interface IOcrProvider {
            public String doOCR(Document, Parameter);
        }

1403 -- public interface ISendFileProvider {
            public boolean showSettingUI(Parameter);
            public boolean doSend(Document, String, Parameter);
        }
```

INFORMATION PROCESSING APPARATUS, CONTROL METHOD FOR INFORMATION PROCESSING APPARATUS, AND PROGRAM STORAGE MEDIUM, RELATING TO DISPLAYING SETTING SCREENS ASSOCIATED WITH EXTENSION SOFTWARE

BACKGROUND

Field

The present invention relates to an information processing apparatus, a control method for an information processing apparatus, and a program storage medium.

Description of the Related Art

Recently, systems enabling image forming apparatuses, installed in offices, to have functions extended have become widely employed. A function that is extended (hereinafter, referred to as an extended function) can be implemented by a software program (hereinafter, referred to as extension software). Using such extension software, functions can be added to apparatuses not only as factory default settings, but can also be added to apparatuses that have been installed and are under operation. A system that provides such extended functionality includes Multifunctional Embedded Application Platform (MEAP)® provided by Canon Inc.

In the context of such extension software, there is a technique for enabling a user to select, download, and install the extension software from an external server, to extend the functions of an image forming apparatus (Japanese Patent No. 4039439).

Among other things, extension software created for predetermined tasks can be known as application software (hereinafter, referred to as an application). The application can utilize functions provided by a facsimile, a scanner, and a printer, of the image forming apparatus to execute processing of a task. The image forming apparatus can install a plurality of such applications in accordance with the tasks desired by a user.

There is also a technique for executing a series of processing steps (hereinafter, referred to as a workflow) with a combination of respective extension software modules independently corresponding to input, conversion, and output. When such a technique is employed, billing is determined in accordance with the combination between the extension software modules and parameters (Japanese Patent Application Laid-Open No. 2014-134872).

In Japanese Patent Application Laid-Open No. 2014-134872, the workflow is executed with a plurality of functions of the image forming apparatus which are combined by using a definition file of the workflow. Each extension software has its own setting screen corresponding to processing to be executed therewith.

Unfortunately, usability can be compromised when the workflow is executed with a plurality of extension software modules combined, due to how the setting screen of the extension software is displayed while the workflow is in process.

For example, when the workflow is executed with a combination of three extension software modules in charge of "scanning", "optical character recognition (OCR)", and "send", a send setting screen is displayed only after the scanning is completed. Thus, the user may have to wait beside the image forming apparatus until the scanning is completed in order to input information into the send setting screen, for example.

SUMMARY OF THE INVENTION

Various embodiments of the present disclosure are directed to providing a system in which when a workflow is created with a plurality of extension software modules combined, setting screens prepared for the extension software modules can be collectively displayed at the top of the workflow, so that a user does not need to consider the order in which the setting screens are called.

According to various embodiments, an information processing apparatus includes the following configuration. The information processing apparatus processes a job with a plurality of extension providers, corresponding to predetermined functions, combined. The information processing apparatus includes a determination unit configured to determine, when a workflow definition file for executing a predetermined job is created with a plurality of extension providers combined, whether at least one of the extension providers to be executed involves displaying of a setting screen corresponding to the at least one of the extension providers to be executed, and a creation unit configured to create, when the determination unit determines that the at least one of the extension providers involves displaying of a setting screen, a workflow definition file in which the setting screen corresponding to the at least one extension provider is displayed before processing corresponding to a predetermined function to be executed by each extension provider is executed.

Further features will become apparent from the following description of exemplary embodiments with reference to the attached drawings.

BRIEF DESCRIPTION OF THE DRAWINGS

FIG. 6 is a diagram illustrating an example of a function provider I/F information table according to one embodiment.

FIG. 8 is a diagram illustrating a first description example of a workflow definition file according to one embodiment.

FIG. 9 is a diagram illustrating a second description example of the workflow definition file according to one embodiment.

FIG. 10 is a diagram illustrating a third description example of the workflow definition file according to one embodiment.

FIG. 13 is a diagram illustrating an example of a function provider information table according to one embodiment.

FIG. 14 is a diagram illustrating an example of a function provider interface definition according to one embodiment.

DESCRIPTION OF THE EMBODIMENTS

Exemplary embodiments are described below with reference to the drawings.

<System Configuration>

Figure 1:
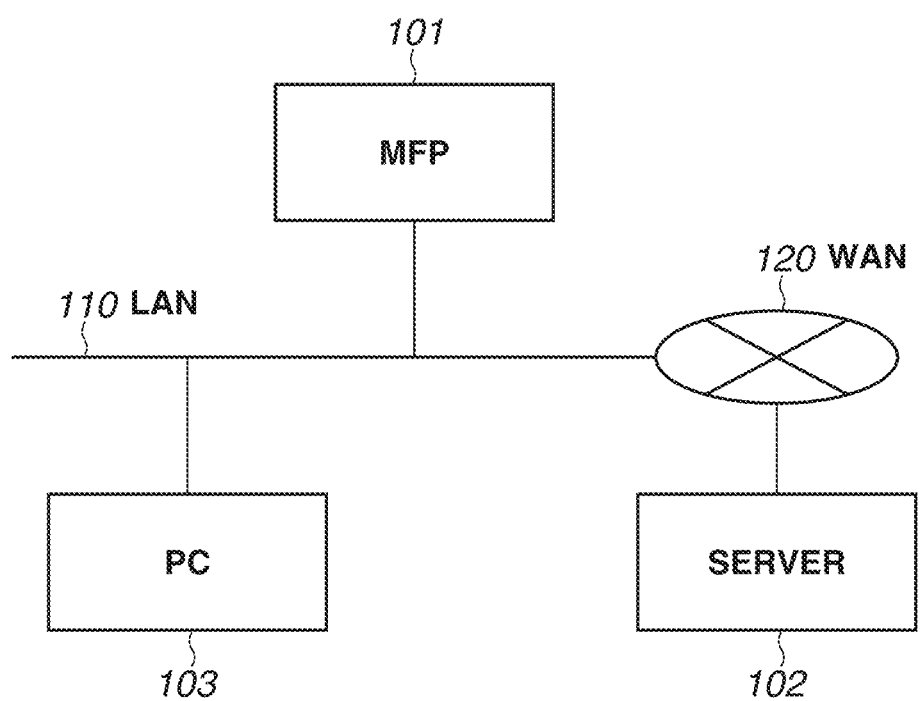
FIG. 1 is a diagram illustrating an example of a system configuration of an image processing system according to one embodiment.

FIG. 1 is a diagram illustrating an example of a system configuration of an image processing system according to the present exemplary embodiment. The system includes a multifunction peripheral (MFP) 101 and a personal computer (PC) 103 serving as data processing apparatuses connected to each other via a local area network (LAN 110), as well as a server 102 connected to these apparatuses via a wide area network (WAN) 120. The apparatuses on the LAN 110 and the apparatus on the WAN 120 can communicate with each other via their networks. FIG. 1 illustrates an example of a typical network configuration, and the apparatuses may each be on any one of the LAN 110 and the WAN 120.

In FIG. 1, the MFP 101 that executes a predetermined job includes a scanner and a printer and thus serves as a multifunction image forming apparatus. The MFP 101 has a software platform with which extension software (extension provider) can be added and executed to operate on the apparatus. The PC 103 is a business terminal apparatus. Software (hereinafter, referred to as a flow creating tool) operating on the PC 103 creates a definition file for a workflow operated on the MFP 101. The server 102 cooperates with the MFP 101 to execute various types of processing. Examples of the server 102 include a file server that receives image data from the MFP 101 and a Web application server that executes optical character recognition (OCR) processing upon receiving a processing request from the MFP 101. The number of server is not limited to one, and a plurality of servers may be used in accordance with the tasks.

Figure 2:
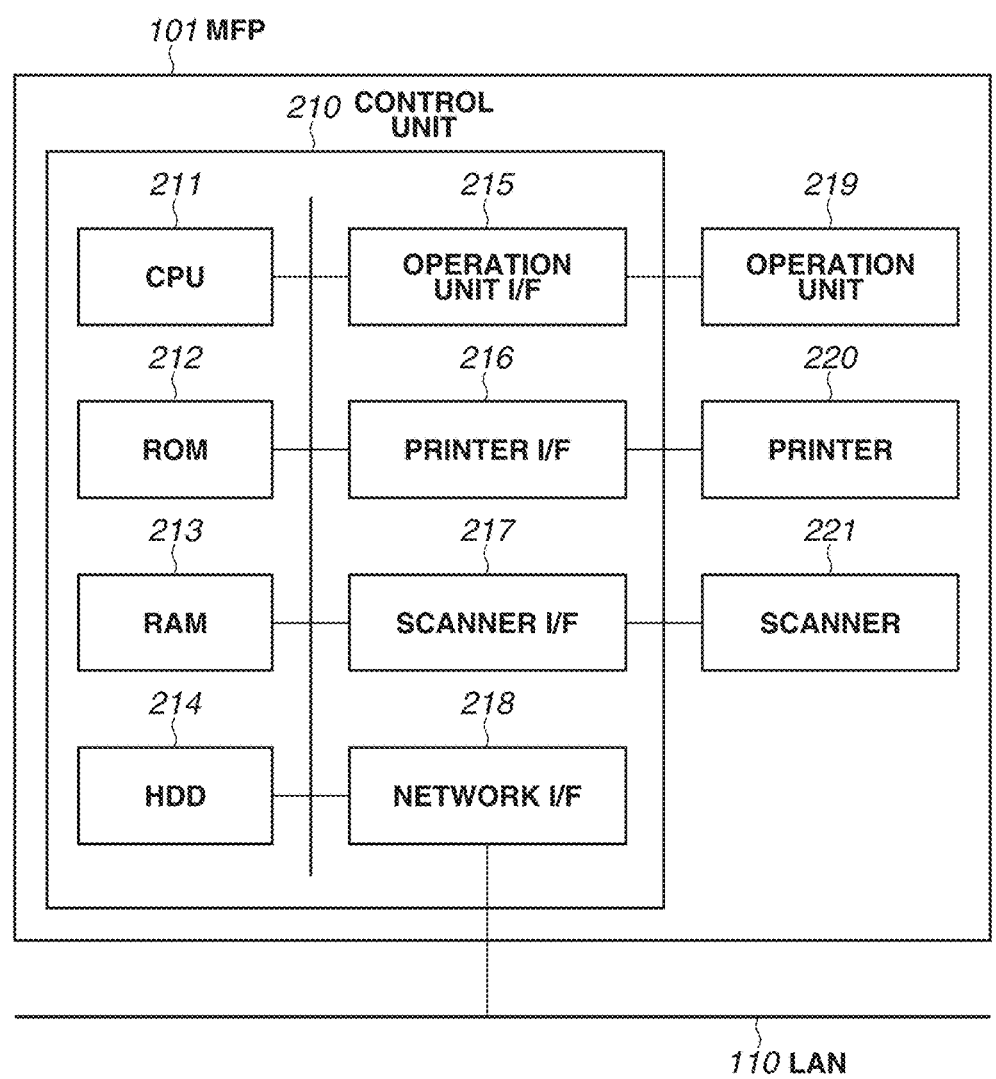
FIG. 2 is a block diagram illustrating a configuration of a multifunction peripheral (MFP) according to one embodiment.

FIG. 2 is a block diagram illustrating a configuration of the MFP 101 illustrated in FIG. 1.

In FIG. 2, a control unit 210 includes a central processing unit (CPU) 211 and controls an operation of the MFP 101 as a whole. The CPU 211 reads out a control program stored in a read-only memory (ROM) 212 or a hard disk drive (HDD) 214, and executes various types of control processing including read control and send control. A random-access memory (RAM) 213 is used by the CPU 211 as a temporary storage area such as a main memory and a work area. The HDD 214 stores image data and various programs including installed extension software.

An operation unit interface (I/F) 215 connects between an operation unit 219 and the control unit 210. The operation unit 219 includes a liquid crystal display unit having a touch panel function and a keyboard.

A printer I/F 216 connects between a printer 220 and the control unit 210. Image data to be printed by the printer 220 is transferred from the control unit 210 to the printer 220 via the printer I/F 216, and is printed on a recording medium in the printer 220.

A scanner I/F 217 connects between a scanner 221 and the control unit 210. The scanner 221 reads an image on an original to generate image data, and inputs the image data to the control unit 210 via the scanner I/F 217. A network I/F 218 connects between the control unit 210 (MFP 101) and the LAN 110. Various pieces of information are transmitted and received to and from another apparatus on the LAN 110 or the WAN 120 via the network I/F 218.

Figure 3:
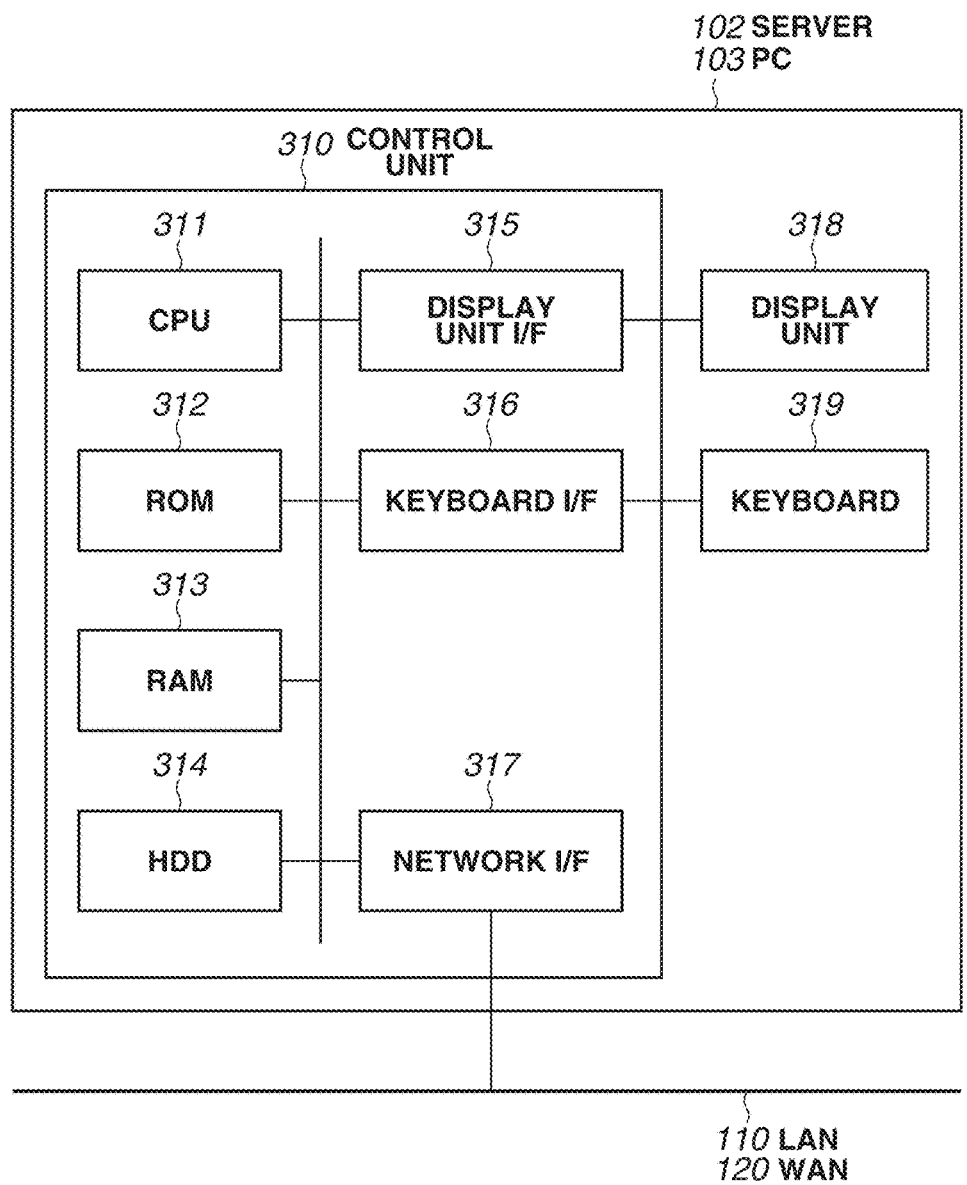
FIG. 3 is a block diagram illustrating a configuration of a server and a personal computer (PC) according to one embodiment.

FIG. 3 is a block diagram illustrating a configuration of the server 102 and the PC 103 illustrated in FIG. 1. In FIG. 3, a control unit 310 includes a CPU 311 and controls an operation of the apparatus as a whole. The CPU 311 reads out a control program stored in a ROM 312 or a HDD 314, and executes various types of control processing. A RAM 313 is used by the CPU 311 as a temporary storage area such as a main memory and a work area. The HDD 314 stores various programs and data.

A display unit I/F 315 connects between a display unit 318 and the control unit 310. A keyboard I/F 316 connects between a keyboard 319 and the control unit 310. The CPU 311 recognizes an instruction from the user through the keyboard 319, and shifts a screen displayed on the display unit 318 in accordance with the recognized instruction.

A network I/F 317 connects between the control unit 310 and the LAN 110 or the WAN 120. Various pieces of information are transmitted and received to and from another apparatus on the LAN 110 or the WAN 120 via the network I/F 317.

Figure 4:
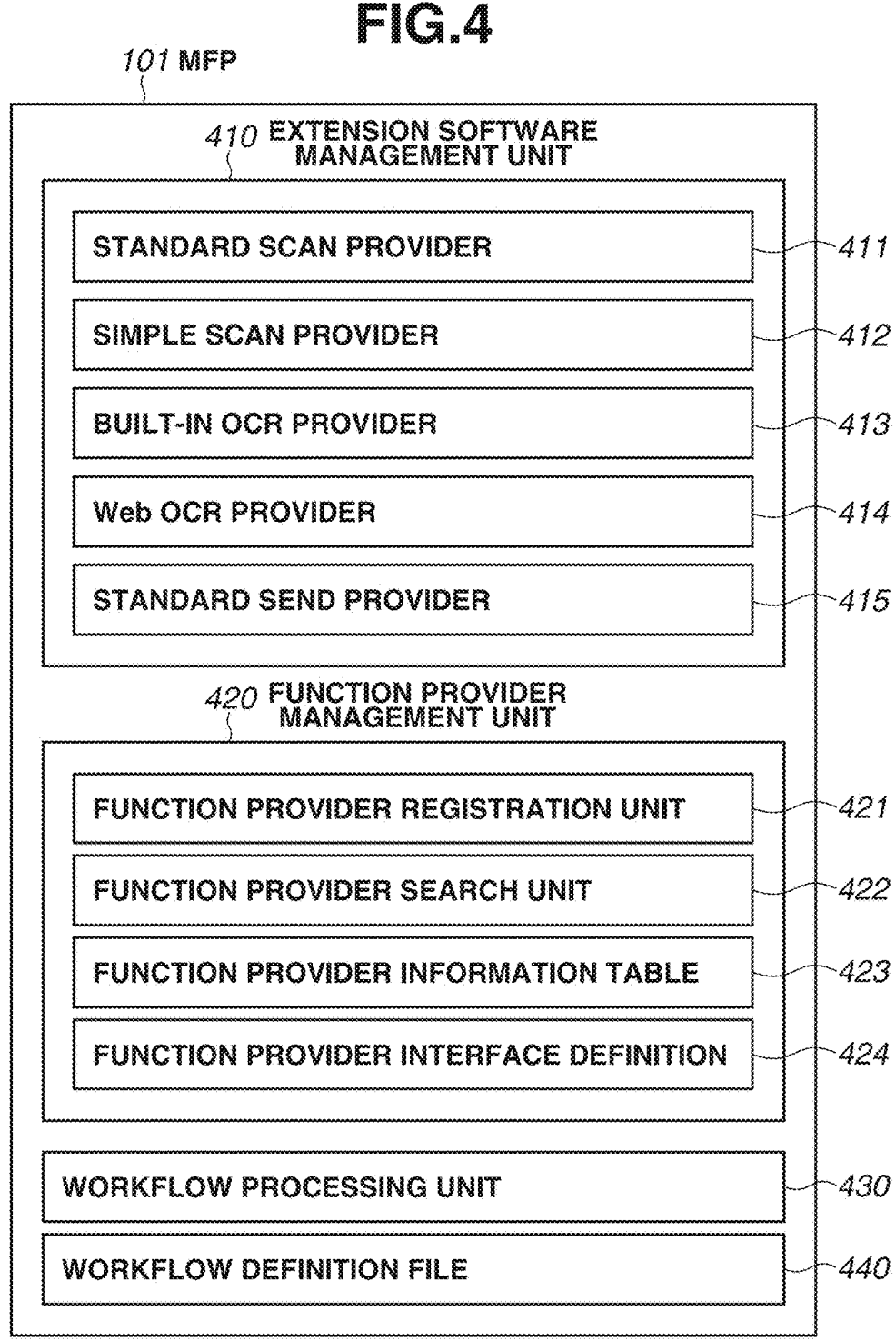
FIG. 4 is a diagram illustrating a software configuration of the MFP according to one embodiment.

FIG. 4 is a diagram illustrating a software configuration of the MFP 101 illustrated in FIG. 1.

Processing described below is executed with a program (software) stored in the HDD 214 of the MFP 101 loaded onto the RAM 213, analyzed, and executed by the CPU 211.

In FIG. 4, an extension software management unit 410 is a software platform with which the extension software is operated on the MFP 101. In FIG. 4, five extension software modules 411 to 415 are installed in the MFP 101 as function providers. When there is a plurality of function providers with a predetermined function, such as scan function providers for example, the function providers are described with a term (OCR provider, scan provider, or the like) representing their providers as appropriate. When predetermined functions are collectively described, the term "function provider" is used.

The function provider is one type of extension software that is not an application. A series of complete processing from an input to an output can be provided with a single application, whereas a single function provider is extension software only providing a single function such as input or output only. Thus, a plurality of function providers needs to be combined to achieve a series of complete processing from an input to an output.

For example, when a function "scan and display preview, and then send" is provided to the user, a single application can achieve three relevant functions "scan", "preview", and "send".

On the other hand, to achieve the function with the function provider, three function providers including "a function provider implementing a scan function", "a function provider implementing a preview function", and "a function provider implementing a send function" are required. Furthermore, the three function providers require a workflow processing unit 430 described below to be executed as the series of processing.

The application registers itself on a menu screen for calling original functions (for example, a copy function and a FAX send function) of the MFP 101. Thus, the application is displayed side by side with the functions. The application is called by an instruction from the user on the menu screen.

On the other hand, the function provider registers itself in a function provider management unit 420 described below, and not on the menu screen. The function provider is called by an instruction issued from the workflow processing unit 430 via the function provider management unit 420. The workflow is executed with a menu item displayed by the workflow processing unit 430 on the menu screen in accordance with a workflow definition file described below.

The function provider is programmed to satisfy a rule (hereinafter, referred to as a function provider interface) defined by the function provider management unit 420. The function provider interface is a software interface defining a rule on interactions between software modules.

The function provider interface is defined for each type of function (hereinafter, referred to as a function type) provided by the function provider. The function provider is called by the workflow processing unit 430 based on the function provider interface.

A single function provider may have a plurality of types of interfaces depending on a task. For example, for a function provider implementing the scan function, a plurality of types of interfaces may be prepared for different tasks such as "display scan setting screen" and "execute scan job".

A plurality of types of function providers can be installed in the MFP 101. A plurality of types of function providers of different function types, or a plurality of function providers of the same function type may be installed. The function providers of the same function type have the same function provider interface. Thus, when the extension software is the function providers of the same function type, the common interaction can take place between software modules.

A standard scan provider 411 and a simple scan provider 412 are each a function provider (function type=scan) providing the scan function. The function providers of the function type "scan" are collectively referred to as a scan provider. The scan provider implements a function provider interface (scan provider interface) defined for the function provider of the function type "scan". The standard scan provider 411 has a scan setting screen for a general user, whereas the simple scan provider 412 has a scan setting screen for an unexperienced user for operation of the MFP 101.

A built-in OCR provider 413 and a Web OCR provider 414 are each a function provider (function type=OCR) that provides an OCR function. The function providers with the function type="OCR" are collectively referred to as an OCR provider. The OCR provider implements a function provider interface (OCR provider interface) defined for the function provider with the function type="OCR". The built-in OCR provider 413 executes character recognition processing on the MFP 101 to provide the OCR function. On the other hand, the Web OCR provider 414 calls the character recognition processing provided by an external Web server (for example, the server 102), via a Web browser 450 to provide the OCR function.

The standard send provider 415 is a function provider (function type=file send) that provides a send function. The standard send provider 415 implements a function provider interface (file send provider interface) defined for the function provider with the function type="file send".

Each function provider implements the function provider interface defined for the corresponding function type, even when there is no other function provider with the same function type in the MFP 101.

The five function providers, including the standard scan provider 411 to the standard send provider 415, described above are merely examples. The various function providers may be, as the extension software, added to and deleted from the MFP 101.

The function provider management unit 420 is software that manages the function providers installed in the MFP 101. The function provider management unit 420 includes a function provider registration unit 421, a function provider search unit 422, a function provider information table 423, and a function provider interface definition 424.

The function provider registration unit 421 registers information, such as a function type and a settable value of each function provider, in the function provider information table 423, upon receiving a request from the corresponding function provider. Each function provider registers itself in the function provider registration unit 421 upon being in an executable state after being installed in the MFP 101.

The function provider search unit 422 receives a search condition for a function provider from the workflow processing unit 430 described below, and identifies the function provider based on information in the function provider information table 423. The function provider search unit 422 determines one function provider as the search result, and thus determines the function provider with the highest priority as the search result when there is a plurality of function providers satisfying the search condition. The function provider interface definition 424 defines the function provider interface.

The workflow processing unit 430 executes a series of processing with a plurality of function providers combined in accordance with a workflow definition file 440 described below. In the present exemplary embodiment, the workflow represents the series of processing executed with a plurality of the function providers combined.

The workflow definition file 440 defines information related to calling for the function provider. The information includes the search condition for the function provider to be called by the workflow processing unit 430, a call order, and a setting value applied to the called function provider. In FIG. 4, a single workflow definition file is defined as an example. However, this should not be construed in a limiting sense, and a plurality of workflow definition files may be provided on the MFP 101.

FIG. 13 is a diagram illustrating an example of the function provider information table 423 illustrated in FIG. 4.

The function provider information table 423 illustrated in FIG. 13 holds information related to a function provider. Such information includes a function provider ID for uniquely identifying the function provider, a name of the function provider, a function type, and a function provider interface.

FIG. 14 is a diagram illustrating an example of the function provider interface definition 424 illustrated in FIG. 4. The same configuration applies to a function provider interface definition 540 described below. In the present exemplary embodiment, the function provider interface is in a source code format for a program. However, this should not be construed in a limiting sense, and other formats may be employed.

In FIG. 14, a definition 1401 for a scan provider interface defines two interfaces including "showSettingUI" and "doScan". The scan provider always includes the two interfaces defined in the definition 1401.

The interface "showSettingUI" is for displaying the scan setting screen, and is for receiving Parameter and returning a result with a Boolean datatype (value of true or false). When the user confirms the scan setting, true is returned, and when the user cancels the scan setting, false is returned.

The Parameter is a setting value used for calling an interface, and is defined in the workflow definition file 440. The interface "doScan" is used for executing the scan processing, and is for receiving the Parameter and returning the result in a data format "Document". With the "doScan", the scan processing is executed based on the value set by the user with "showSettingUI" or a setting value designated with the Parameter.

Similarly, a definition 1402 is for the OCR provider interface and a definition 1403 is for the file send provider interface. As described above, the interface (name, input, and output) of each function provider is defined in the function provider interface definition.

Figure 5:
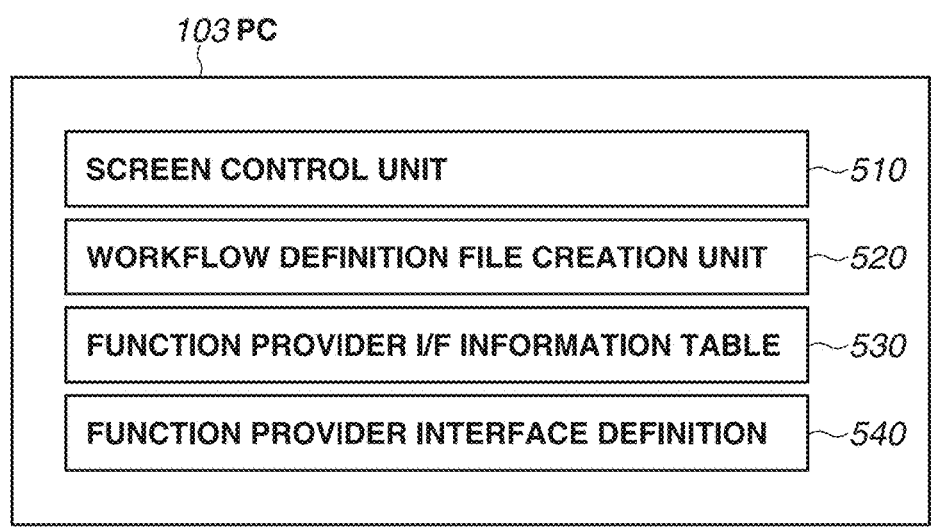
FIG. 5 is a diagram illustrating a software configuration of the PC according to one embodiment.

FIG. 5 is a diagram illustrating a software configuration of the PC 103 illustrated in FIG. 1. The processing described below is executed with a program (software) stored in the HDD 314 of the PC 103 loaded onto the RAM 313, analyzed, and executed by the CPU 311.

A screen control unit 510 in FIG. 5 controls a screen displayed by the flow creating tool. A workflow definition file creation unit 520 creates a workflow definition file used in the MFP 101. A function provider I/F information table 530 is a table storing therein information related to the function provider interface of each function provider, and is stored in the HDD 314. The function provider interface definition 540 is the same as the function provider interface definition 424 of the MFP 101.

FIG. 6 is a diagram illustrating an example of the function provider I/F information table 530 illustrated in FIG. 5.

As illustrated in FIG. 6, the function provider I/F information table 530 holds information on the function provider interface such as a function type ID, a function type name, a function provider interface, a setting interface, and an execution interface of the function provider. The setting interface is a function provider interface for calling the setting screen of the function provider. The execution interface is a function provider interface for calling execution processing of the function provider.

According to the definition in an example illustrated in FIG. 6, the scan provider and the send provider have the setting interface and the execution interface, and the OCR provider has the execution interface only.

Figure 7:
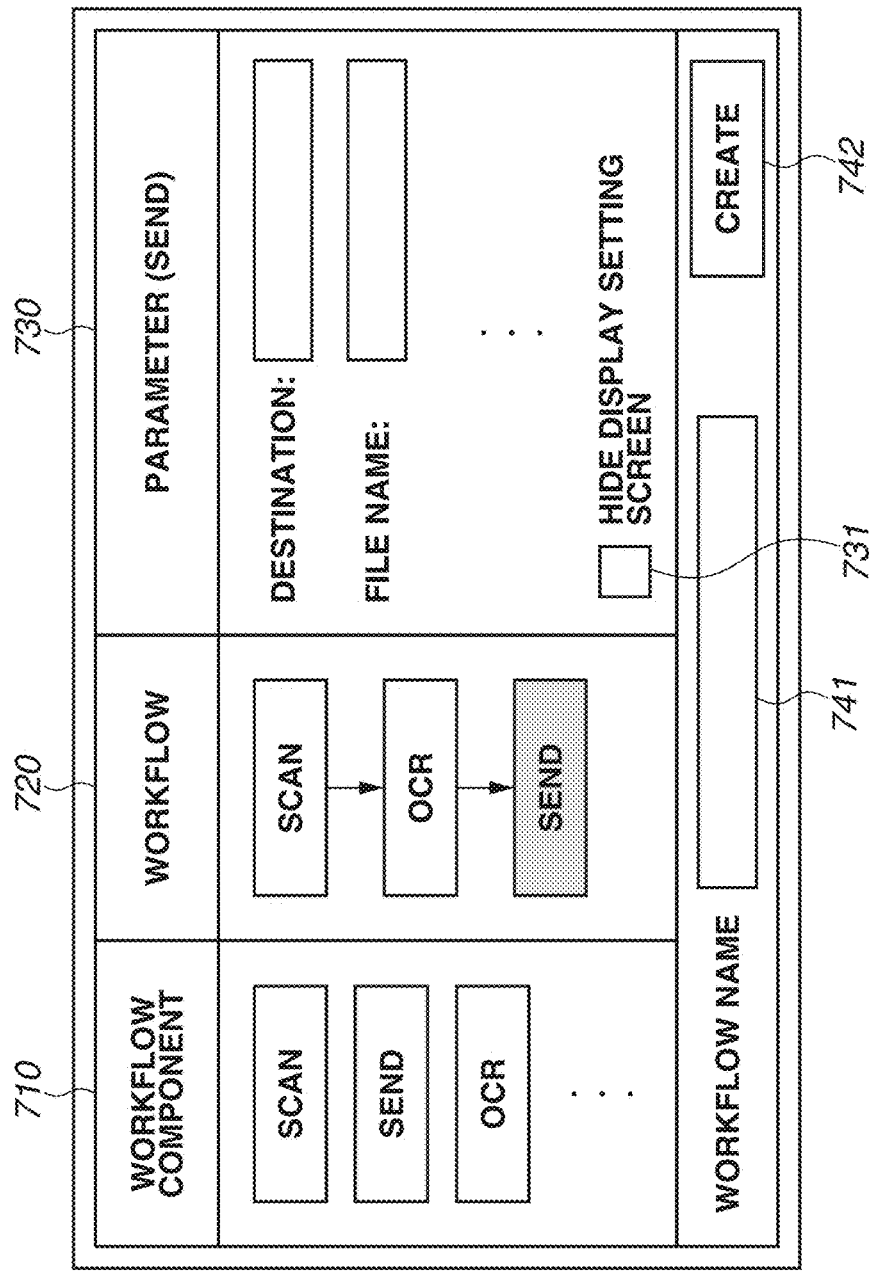
FIG. 7 is a diagram illustrating an example of a screen displayed by a flow creating tool operating on the PC according to one embodiment.

FIG. 7 is a diagram illustrating an example of a screen displayed by the flow creating tool operating on the PC 103 illustrated in FIG. 1.

In FIG. 7, in an area 710, a list of the function providers (function types), defined in the function provider I/F information table 530, is displayed. In FIG. 7, each function provider is in a form of a button. Alternatively, the function provider may be in other forms.

In an area 720, a flow of the workflow is defined. The flow of the workflow is defined by arranging function providers, required for the workflow, selected from the buttons displayed in the area 710. In the workflow defined in FIG. 7, "scan", "OCR", and "send" are performed in this order.

In an area 730, setting is performed for each function provider, and a setting screen for a selected one of the function providers arranged in the area 720 is displayed. In FIG. 7, the setting screen for the send provider is displayed as an example. The area 730 includes a checkbox 731. The checkbox 731 is used for a setting for hiding the setting screen on the MFP 101 for the target function provider, when the target function provider is executed by the MFP 101.

The function provider with the checkbox 731 turned ON is executed with setting values set in the area 730 without displaying the setting screen while the workflow is in process. The checkbox 731 is displayed only for the function provider having the setting interface.

In a text field 741, the workflow name is input. A button 742 is pressed to give an instruction of creating of the workflow definition file.

FIG. 8 is a diagram illustrating a first description example of the workflow definition file 440 illustrated in FIG. 4. This example represents a case where the following setting is made with the flow creating tool. The function providers for "scan", "OCR", and "send" are arranged in this order in the area 720 in FIG. 7. The checkbox 731 is OFF in the setting for the scan provider and the send provider. The OCR provider has no setting interface and thus the checkbox 731 is not displayed therefor.

In the present exemplary embodiment, the workflow definition file is described as a file in an Extensible Markup Language (XML) format. However, the format is not limited to the XML format, and may be in other formats.

A Workflow tag 810 indicates that the description therebelow defines a workflow. A name attribute defining the workflow name in the Workflow tag 810 is used for a value input to the text field 741 illustrated in FIG. 7.

An FP tag 820 is a child element of the Workflow tag 810, and defines information on the function provider executed in the workflow. A no attribute of the FP tag 820 defines an order of the function provider in the workflow, and has a value indicating the order set in accordance with the flow of the workflow set in the area 720 in FIG. 7. The no attribute "no="1"" indicates that the function provider is at the top. A type attribute of the FP tag 820 defines the function type of the function provider. A type attribute "type=SCAN" indicates that the function provider is the scan provider.

Similarly the second function provider in the workflow is defined as the OCR provider in an FP tag 830, and the third function provider in the workflow is defined to be the send provider in an FP tag 840. A Condition tag 821 is a child element of the FP tag 820 and defines a search condition for the scan provider.

Action tags 822 and 823 are child elements of the FP tag 820, and define information related to calling of a function provider interface. The Action tag has child elements including a Parameter tag and an Output tag. The Parameter tag is a setting for the calling. The Output tag defines how a result of executing "doScan" is output.

A no attribute of an Action tag defines a call order of the function provider interface in the entire workflow. A method attribute of the Action tag defines a function provider interface to be called. The "showSettingUI" interface of the scan provider is defined in an Action tag 822 to be the first one to be called in the entire workflow to be executed.

The Action tags defined in FIG. 8 are arranged as follows in accordance with the order of no (execution order).
1. Display the setting interface of the scan provider defined in the Action tag 822.
2. Display the setting interface of the send provider defined in an Action tag 841.
3. Execute the execution interface of the scan provider defined in the Action tag 823.
4. Execute the execution interface of the OCR provider defined in an Action tag 831.
5. Execute the execution interface of the send provider defined in an Action tag 842.

As described above, the workflow definition file 440 is defined in such a manner that the setting interface is called earlier than the execution interface, regardless of the order of the function providers.

FIG. 9 is a diagram illustrating a second description example of the workflow definition file 440 illustrated in FIG. 4. This example represents a case where the following setting is made with the flow creating tool. The function providers "scan", "OCR", and "send" are arranged in this order in the area 720 in FIG. 7. The checkbox 731 is ON in the setting for the scan provider, and is OFF in the setting for the send provider.

A Workflow tag 910, FP tags 920, 930, and 940 have the same definitions as the Workflow tag 810, the FP tags 820, 830, and 840 in FIG. 8, and thus the description thereof is omitted. Action tags defined in FIG. 9 are arranged as follows in accordance with the order defined by no.

1. Display the setting interface of the send provider defined in an Action tag 941.
2. Execute the execution interface of the scan provider defined in an Action tag 921.
3. Execute the execution interface of the OCR provider defined in an Action tag 931.
4. Execute the execution interface of the send provider defined in an Action tag 942.

The setting interface of the scan provider is not defined in the workflow definition file because the checkbox 731 is ON in the setting for the scan provider.

FIG. 10 is a diagram illustrating a third description example of the workflow definition file 440 illustrated in FIG. 4. This example represents a case where the following setting is made with the flow creating tool. The function providers "scan", "OCR", and "send" are arranged in this order in the area 720 in FIG. 7. The checkbox 731 is OFF in the setting for the scan provider and the send provider. Furthermore, the setting for the send provider includes a setting for using the execution result of the OCR provider as a send file name.

A Workflow tag 1010, FP tags 1020, 1030, and 1040 have the same definition as the Workflow tag 810, the FP tags 820, 830, and 840 in FIG. 8, and thus the description thereof is omitted.

An Output tag 1032 is a child element of an Action tag 1031 and defines how a result of executing "doOCR" is output. It is defined in the Output tag 1032 that the output format indicated by the type attribute is "String (character string)", and that an ID uniquely identifying output data indicated by an id attribute is "bar".

An Input tag 1042 is a child element of an Action tag 1041 and indicates that data in the "String" format is received from data with the ID "bar" as the definition related to an input with "showSettingUI" of the send provider. The data with the ID "bar" is output data as a result of "doOCR" defined in the output tag 1032. Thus, the execution result of the OCR provider is defined to be received in the String format, for calling of the setting interface of the send provider.

A Property tag 1043 is a child element of the Parameter tag, and defines an item of the parameter for calling "showSettingUI" of the send provider. A parameter "FILE_NAME" corresponds to the send file name, and has a value "ABC % bar %". A definition "% bar %" indicates that replacement with the data with the ID "bar" is performed when the function provider interface is called. Thus, the setting screen of the send provider is defined in the Property tag 1043 to be displayed with a character string including the execution result of the OCR provider added after the "ABC_", preset as the send file name. When there is a plurality of steps for displaying the setting screens, the order of the predetermined processing steps executed by the extension providers is determined so that the setting screens are called and displayed based on the order (see FIG. 10).

Action tags defined in FIG. 10 are arranged as follows in accordance with the order of no (execution order of the processing steps).

1. Display the setting interface of the scan provider defined in an Action tag 1021.
2. Execute the execution interface of the scan provider defined in an Action tag 1022.
3. Execute the execution interface of an OCR provider defined in the Action tag 1031.
4. Display the setting interface of the send provider defined in the Action tag 1041.
5. Execute the execution interface of the send provider defined in an Action tag 1044.

When the calling of the function provider interfaces involves dependencies, the no attributes of the Action tags are defined without contradicting the dependencies. Examples of the dependencies include that for a subsequent extension provider to display the setting screen. In the example illustrated in FIG. 10, a result of calling the execution interface of the OCR provider is required for calling the setting interface of the send provider, and thus the no attributes are defined without contradicting this dependency.

[Processing for Creating Workflow Definition File]

Figure 11:
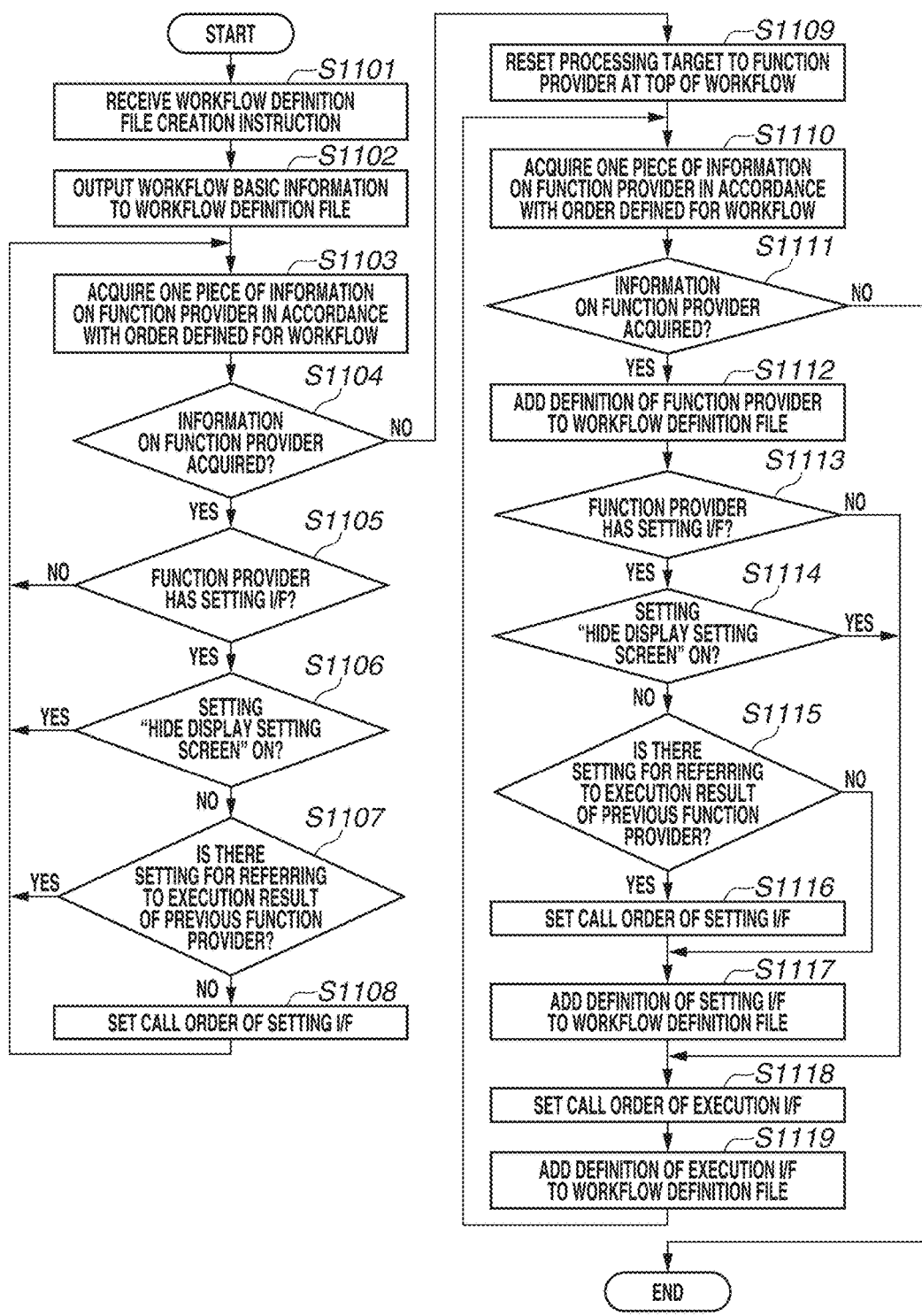
FIG. 11 is a flowchart illustrating an example of data processing in an information processing apparatus according to one embodiment.

FIG. 11 is a flowchart illustrating an example of data processing executed in the information processing apparatus according to the present exemplary embodiment. This is an example of processing of creating, with the flow creating tool, a workflow definition file in which a step of displaying a setting screen corresponding to each function provider is executed before a step corresponding to a predetermined function implemented by the corresponding function provider. Each step in FIG. 11 is executed with a program stored in the HDD 314 of the PC 103 loaded onto the RAM 313, analyzed, and executed by the CPU 311.

In step S1101, the screen control unit 510 receives a workflow definition file creation instruction. In step S1102, the workflow definition file creation unit 520 outputs basic information to the workflow definition file. The basic information includes an ID and a name of the workflow. In step S1103, the workflow definition file creation unit 520 acquires one piece of information on the function provider in accordance with an arrangement order in the workflow in the area 720 of the flow creating tool. The information thus acquired includes information defined in the function provider I/F information table 530 and a parameter setting (a setting value in the area 730) of the function provider.

In step S1104, the workflow definition file creation unit 520 determines whether the information on the function provider is acquired in step S1103. When there is a function provider for which the information is to be acquired and thus the information is acquired (YES in step S1104), the processing proceeds to step S1105. On the other hand, when there is no longer a function provider for which the information is to be acquired and thus no information is acquired (NO in step S1104), the processing proceeds to step S1109.

In step S1105, the workflow definition file creation unit 520 determines whether the function provider has the setting interface. When the function provider has the setting interface (YES in step S1105), the processing proceeds to step S1106. On the other hand, when the function provider has no setting interface (NO in step S1105), the processing returns to step S1103.

In step S1106, the workflow definition file creation unit 520 determines whether the setting "hide setting screen" (checkbox 731) of the function provider is ON. When the setting "hide setting screen" is ON (YES in step S1106), the processing returns to step S1103. On the other hand, when the setting "hide setting screen" is OFF (NO in step S1106), the processing proceeds to step S1107. In step S1107, the workflow definition file creation unit 520 determines whether the parameter setting (setting value in the area 730) of the function provider includes a setting for referring to an execution result of a previous function provider.

When there is the setting for referring to an execution result of a previous function provider (YES in step S1107), the processing returns to step S1103. On the other hand, when there is no setting for referring to an execution result of a previous function provider (NO in step S1107), the processing proceeds to step S1108. An example of the setting for referring to an execution result of a previous function provider includes a setting for the send provider in which the execution result of the OCR provider is used as the send file name, described with reference to FIG. 10.

In step S1108, the workflow definition file creation unit 520 sets the call order (the no attribute of the Action tag) of the setting interface of the function provider in the workflow to be executed. The call order is sequentially incremented from 1. The processing proceeds to step S1103 after the processing in step S1108 is completed.

In step S1109, the workflow definition file creation unit 520 resets the function provider for which the information is to be acquired to the function provider at the top of the workflow. In step S1110, the workflow definition file creation unit 520 acquires one piece of information on the function provider in accordance with the arrangement order in the workflow in the area 720 of the flow creating tool. The information acquired in this step includes information defined in the function provider I/F information table 530 and a parameter setting (a setting value in the area 730) of the function provider, as in step S1103.

In step S1111, the workflow definition file creation unit 520 determines whether the information on the function provider is acquired in step S1110. When there is a function provider for which information is to be acquired and thus the information is acquired (YES in step S1111), the processing proceeds to step S1112. On the other hand, when there is no longer a function provider for which information is to be acquired and thus no information is acquired (NO in step S1111), the processing is terminated.

In step S1112, the workflow definition file creation unit 520 adds the definition of the function provider, including the arrangement order in the workflow and the function type ID of the function provider, to the workflow definition file for which the output is performed in step S1102. In step S1113, the workflow definition file creation unit 520 determines whether the function provider has the setting interface. When the function provider has the setting interface (YES in step S1113), the processing proceeds to step S1114. On the other hand, when the function provider has no setting interface (NO in step S1113), the processing proceeds to step S1118.

In step S1114, the workflow definition file creation unit 520 determines whether the setting "hide setting screen" (checkbox 731) of the function provider is ON. When the setting "hide setting screen" is ON (YES in step S1114), the processing proceeds to step S1118. On the other hand, when the setting "hide setting screen" is OFF (NO in step S1114), the processing proceeds to step S1115. In step S1115, the workflow definition file creation unit 520 determines whether the parameter setting (setting value in the area 730) of the function provider includes a setting for referring to an execution result of a previous function provider. When there is the setting for referring to the execution result of the previous function provider (YES in step S1115), the processing proceeds to step S1116. On the other hand, when there is no setting for referring to the execution result of the preceding function provider (NO in step S1115), the processing proceeds to step S1117.

In step S1116, the workflow definition file creation unit 520 sets a call order (the no attribute of the Action tag) of the setting interface of the function provider in the workflow to be executed. The call order set in this step continues from the order set in the preceding steps.

In step S1117, the workflow definition file creation unit 520 adds the definition related to the setting interface of the function provider to the workflow definition file. The definition related to the setting interface is a definition required at the time when the workflow is executed, and includes the call order in the workflow to be executed, the setting interface to be called, and a parameter given to the setting interface at the time of calling.

In step S1118, the workflow definition file creation unit 520 sets the call order (the no attribute of the Action tag) of the execution interface of the function provider in the workflow to be executed. The call order set in this step continues from the order set in the preceding steps.

In step S1119, the workflow definition file creation unit 520 adds the definition related to the execution interface of the function provider to the workflow definition file. The definition related to the execution interface is required when the workflow is executed, and includes the call order in the workflow to be executed, the execution interface to be called, and a parameter given to the execution interface at the time of the calling. The processing returns to step S1110, when the processing in step S1119 is completed.

The flow creating tool creates the workflow definition file by executing the steps described above.

Figure 12:
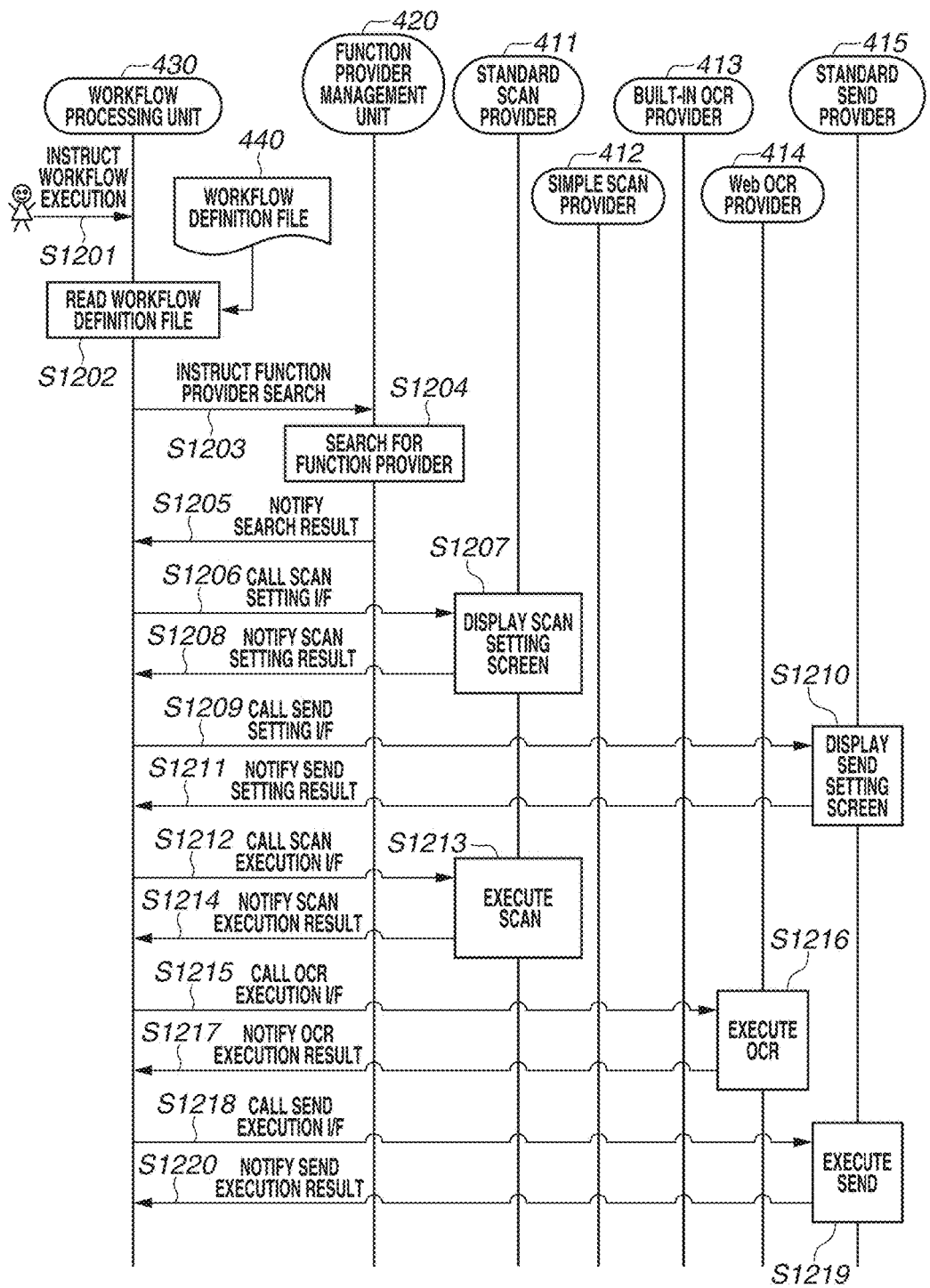
FIG. 12 is a sequence diagram illustrating an example of a flow of executing a workflow according to one embodiment.

FIG. 12 is a sequence diagram illustrating an example of a flow of executing a workflow on the MFP 101 according to the present exemplary embodiment. The steps below are described assuming that the workflow definition file 440 has the content described with reference to FIG. 8.

In step S1201, the workflow processing unit 430 receives a workflow execution instruction from the user. In step S1202, the workflow processing unit 430 reads the workflow definition file 440 corresponding to the execution instruction.

In step S1203, the workflow processing unit 430 instructs the function provider management unit 420 to search for the function provider described in the workflow definition file 440. The workflow definition file 440 includes the description on "the function provider with the function type=scan", "the function provider with the function type=OCR", and "the function provider with the function type=send". Thus, the instruction is given with the three search conditions designated.

In step S1204, the function provider management unit 420 extracts the function provider satisfying the search conditions based on the function provider information table 423. When a plurality of the scan provider satisfying the search conditions is found, the scan provider with the highest priority is determined as the search result. In this example, the standard scan provider 411, the Web OCR provider 414, and the standard send provider 415 are extracted. In step S1205, the function provider management unit 420 notifies the workflow processing unit 430 of the function provider as the search result.

In step S1206, the workflow processing unit 430 calls the setting interface of the standard scan provider 411 in accordance with the call order (no attribute of the Action tag) defined in the workflow definition file 440.

In step S1207, the standard scan provider 411 that has received the call for the setting interface from the workflow processing unit 430 displays the scan setting screen in response to the instruction. In step S1208, the standard scan provider 411 notifies the workflow processing unit 430 of the result of the scan setting.

In step S1209, the workflow processing unit 430 calls the setting interface of the standard send provider 415 in accordance with the call order defined in the workflow definition file 440.

In step S1210, the standard send provider 415 that has received the call for the setting interface from the workflow processing unit 430 displays the send setting screen in response to the instruction. In step S1211, the standard send provider 415 notifies the workflow processing unit 430 of the result of the send setting.

In step S1212, the workflow processing unit 430 calls the execution interface of the standard scan provider 411 in accordance with the call order defined in the workflow definition file 440.

In step S1213, the standard scan provider 411 that has received the call for the execution interface from the workflow processing unit 430 executes scan processing in response to the instruction. In step S1214, the standard scan provider 411 notifies the workflow processing unit 430 of the result of the scan processing.

In step S1215, the workflow processing unit 430 calls the execution interface of the Web OCR provider 414 in accordance with the call order defined in the workflow definition file 440.

In step S1216, the Web OCR provider 416 that has received the call for the execution interface from the workflow processing unit 430 executes OCR processing in response to the instruction. In step S1217, the Web OCR provider 416 notifies the workflow processing unit 430 of the result of the OCR processing.

In step S1218, the workflow processing unit 430 calls the execution interface of the standard send provider 415 in accordance with the call order defined in the workflow definition file 440.

In step S1219, the standard send provider 415 that has received the call for the execution interface from the workflow processing unit 430 executes send processing in response to the instruction. In step S1220, the standard send provider 415 notifies the workflow processing unit 430 of the result of the send processing.

Through the procedure described above, the workflow can be created with a plurality of extension software modules combined, while being defined in such a manner that the setting screens of the extension software modules can be collectively displayed at the top of the workflow so that the user creating the workflow needs not to consider the call order of the setting screens. For example, the workflow involving dependency between extension software modules can be defined in such a manner that the setting screens are displayed in the call order based on the dependency without the user considering the dependency. An example of such a dependency requires the execution result of previous extension software to display a setting screen of the current extension software in the workflow.

In the exemplary embodiment described above, when a workflow is created with a plurality of software modules combined, setting screens prepared for the extension software modules can be collectively displayed at the top of the workflow so that a user needs not to consider a call order of the setting screens.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims is to be accorded the broadest interpretation so as to encompass all such modifications and equivalent structures and functions.

This application claims the benefit of Japanese Patent Application No. 2016-012242, filed Jan. 26, 2016, which is hereby incorporated by reference herein in its entirety.

What is claimed is:

1. An information processing apparatus comprising:
one or more processors; and
one or more memories storing instructions that, when executed by the one or more processors, cause the information processing apparatus to perform operations comprising:
determining, when a workflow definition file for executing a predetermined job is created with a plurality of extension providers combined, whether a first extension provider included in the plurality of extension providers involves displaying of a setting screen;
determining whether the first extension provider includes a setting for referencing a result of a preceding extension provider;
creating, in a case where it is determined that the first extension provider involves displaying of the setting screen and that the first extension provider does not include the setting for referencing the result of a preceding extension provider, a workflow definition file that executes the displaying of the setting screen corresponding to the first extension provider before execution of processing associated with a particular function executed by the preceding extension provider; and
creating, in a case where it is determined that the first extension provider involves displaying of the setting screen and that the first extension provider includes the setting for referencing the result of a preceding extension provider, a workflow definition file that executes the displaying of the setting screen corresponding to the first extension provider not before execution of the processing associated with the particular function executed by the preceding extension provider.

2. The information processing apparatus according to claim 1, wherein the creating a workflow definition file further comprises:
   determining whether two or more extension providers included in the plurality of extension providers involve displaying of a setting screen; and
   when it is determined that two or more of the extension providers involve displaying of a setting screen, determining an order of the processing to be executed by the two or more extension providers, wherein the setting screens are called and displayed based on the order.

3. The information processing apparatus according to claim 1, wherein when there is a dependency requiring the displaying of the setting screen of one of the extension providers to be executed in accordance with a result of the processing to be executed by a preceding one of the extension providers, the workflow definition file having a call order based on the dependency is created.

4. The information processing apparatus according to claim 1, wherein when a setting for cancelling the displaying of the setting screen is selected, the work definition file in which the displaying of the setting screen is not called is created.

5. The information processing apparatus according to claim 1, wherein processing associated with the plurality of extension providers includes scanning an original, executing character recognition on an image on the scanned original, and setting a send file name to be information that is a result of the character recognition.

6. The information processing apparatus according to claim 1, wherein the information processing apparatus includes an image forming apparatus and a multifunction image forming apparatus.

7. The information processing apparatus according to claim 1, wherein, in a case where it is determined in the determining that the first extension provider involves displaying of a setting screen and that the first extension provider does not include the setting for referencing the result of a preceding extension provider, a workflow definition file that executes processing associated with a particular function corresponding to the first extension provider not before execution of the processing associated with the particular function executed by the preceding extension provider is created.

8. A control method for an information processing apparatus, the method comprising:
   determining, when a workflow definition file for executing a predetermined job is created with a plurality of extension providers combined, whether a first extension provider included in the plurality of extension providers involves displaying of a setting screen;
   determining whether the first extension provider includes a setting for referencing a result of a preceding extension provider;
   creating, in a case where it is determined that the first extension provider involves displaying of the setting screen and that the first extension provider does not include the setting for referencing the result of a preceding extension provider, a workflow definition file that executes the displaying of the setting screen corresponding to the first extension provider before execution of processing associated with a particular function executed by the preceding extension provider; and
   creating, in a case where it is determined that the first extension provider involves displaying of the setting screen and that the first extension provider includes the setting for referencing the result of a preceding extension provider, a workflow definition file that executes the displaying of the setting screen corresponding to the first extension provider not before execution of the processing associated with the particular function executed by the preceding extension provider.

9. The control method for an information processing apparatus according to claim 8, wherein creating a workflow definition file further comprises:
   determining whether two or more extension providers included in the plurality of extension providers involve displaying of a setting screen; and
   when it is determined that two or more of the extension providers involve displaying of a setting screen, determining an order of processing to be executed by the at two or more extension providers, wherein the setting screens are called and displayed based on the order.

10. The control method for an information processing apparatus according to claim 8, wherein when there is a dependency requiring the displaying of the setting screen of one of the extension providers to be executed in accordance with a result of the processing to be executed by a preceding one of the extension providers, the workflow definition file having a call order based on the dependency is created in the creating.

11. The control method for an information processing apparatus according to claim 8, wherein when a setting for cancelling the displaying of the setting screen is selected, the work definition file in which the displaying of the setting screen is not called is created in the creating.

12. The control method for an information processing apparatus according to claim 8, wherein processing associated with the plurality of extension providers includes scanning an original, executing character recognition on an image on the scanned original, and setting a send file name to be information that is a result of the character recognition.

13. The control method according to claim 8, wherein, in a case where it is determined in the determining that the first extension provider involves displaying of the setting screen and that the first extension provider does not include a setting for referencing the result of a preceding extension provider, a workflow definition file that executes the processing associated with the particular function corresponding to the first extension provider not before execution of the processing associated with the particular function executed by the preceding extension provider is created.

14. A non-transitory computer readable medium that stores a program for causing a computer to perform a process comprising:
   determining, when a workflow definition file for executing a predetermined job is created with a plurality of extension providers combined, whether a first extension provider included in the plurality of extension providers involves displaying of a setting screen;
   determining whether the first extension provider includes a setting for referencing a result of a preceding extension provider;
   creating, in a case where it is determined that the first extension provider involves displaying of the setting screen and that the first extension provider does not include the setting for referencing the result of a preceding extension provider, a workflow definition file that executes the displaying of the setting screen corresponding to the first extension provider before execution of processing associated with a particular function executed by the preceding extension provider; and creating, in a case where it is determined that the first extension provider involves displaying of the setting screen and that the first extension provider includes the setting for referencing the result of a preceding extension provider, a workflow definition file that executes the displaying of the setting screen corresponding to the first extension provider not before execution of the processing associated with the particular function executed by the preceding extension provider.

* * * * *